(12) United States Patent
Takeda

(10) Patent No.: US 6,383,613 B1
(45) Date of Patent: May 7, 2002

(54) DECORATIVE FILM AND METHOD FOR THE PRODUCTION OF THE SAME

(75) Inventor: Yasuyuki Takeda, Yamagata (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/786,634

(22) PCT Filed: Sep. 21, 1999

(86) PCT No.: PCT/US99/21872

§ 371 Date: Mar. 7, 2001

§ 102(e) Date: Mar. 7, 2001

(87) PCT Pub. No.: WO00/23287

PCT Pub. Date: Apr. 27, 2000

(30) Foreign Application Priority Data

Oct. 16, 1998 (JP) .......................................... 10-295221

(51) Int. Cl.⁷ ................................................. B32B 3/00
(52) U.S. Cl. .................... 428/195; 428/542.2; 428/913
(58) Field of Search ................................ 428/195, 913, 428/542.2

(56) References Cited

U.S. PATENT DOCUMENTS

5,130,461 A 7/1992 Shinohara

FOREIGN PATENT DOCUMENTS

| EP | 0 459 720 A | 12/1991 |
| JP | A-62-231753 | 10/1987 |
| JP | A-4-41493 | 2/1992 |
| JP | 5097868 | 4/1993 |

OTHER PUBLICATIONS

Database WPI, Section Ch, Week 198609, Derwent Publications Ltd., London, GB; Class A94, An 1986–058895 XP002131680 & JP 61 010414 A (Dainippon Printing Co Ltd), Jan. 17, 1986 abstract.

Patent Abstracts of Japan vol. 015, No. 260 (M–1131), Jul. 2, 1991 (Jul. 2, 1991) & JP 03 086646 A (Kuraray Co Ltd), Apr. 11, 1991 Abstract.

Patent Abstracts of Japan, vol. 008, No. 026 (M–273), Feb. 3, 1984 & JP 58 185214 A (Toobi:KK;Others: 01), Oct. 28, 1983 abstract.

Database WPI, Section Ch, Week 198639, Derwent Publications Ltd., London, GB; Class A97, AN 1986–254095 XP002131681 & JP 61 110583 A(Toppan Printing Co Ltd), May 28 1986 abstract.

*Primary Examiner*—Cathy Lam
(74) *Attorney, Agent, or Firm*—Carolyn V. Peters

(57) ABSTRACT

To provide a method for the production of a decorative film, by which minute uneven patterns can randomly be formed on a metal layer, and a decorative film which presents rainbow color appearances irrespective of observing directions. The decorative film of the present invention is produced from a decorative film precursor comprising the first resin layer, the second layer having a thickness of 0.3 to 0.8 $\mu$m, and a metal layer, which are laminated in this order. When the decorative film precursor is heated at a specific temperature for a certain time, and then cooled, the second resin layer reversibly expands and shrinks. During the expansion and shrinkage of the second resin layer, the metal layer in contact with the second resin layer plastically deforms, and minute uneven patterns are formed. The minute uneven patterns function as a diffraction gratin which presents rainbow color appearances irrespective of observing directions.

3 Claims, 1 Drawing Sheet

DECORATIVE FILM AND METHOD FOR THE PRODUCTION OF THE SAME

FIELD OF THE INVENTION

The present invention relates to a decorative film having a rainbow color appearance and a method for the production of the same.

BACKGROUND OF THE INVENTION

Films having a rainbow color appearance are often used for decoration. Such decorative films have a multi-layer structure having a diffraction grating which presents a rainbow color appearance through light interference.

For example, JP-A-62-231753 discloses, as a laminate for decoration, a film comprising a substrate of a thermosetting resin and a reflective thin film formed on said substrate and made of a metal having thin striped uneven patterns which are formed in parallel with each other. In this laminate, the above uneven patterns, which are formed on the reflective thin film, function as a diffraction grating. In general, the reflection-type diffraction grating can provide a rainbow color appearance having a higher contrast than a transmission-type diffraction grating, when it is illuminated with light having a high intensity.

Furthermore, JP-A-62-231753 describes that the uneven patterns are in parallel with each other, and thus the film can provide a high luminance in a specific direction and give a high quality image to the rainbow color appearance.

The film of the above JP-A publication, which provides a high luminance in the specific direction, cannot present rainbow color appearance in many directions. That is, the rainbow color appearance greatly changes depending on observing direction. Such heterogeneity of the rainbow color appearances is less preferable from the viewpoint of visibility.

In the production process of such a film, a thermosetting resin layer is laminated on a substrate and incompletely cured, and a metal is vapor deposited on the thermosetting resin layer. Then, the thermosetting resin layer is completely cured and shrunk, whereby the deposited metal layer crinkles to form a reflective thin layer having uneven patterns.

However, the above curing reaction of a thermosetting resin is an irreversible reaction which is difficult to control. The difficulty of the control of this reaction further increases since this reaction is induced by heat which is in general difficult to manage. As the result, films having constant quality cannot be produced, and they cannot present the rainbow color appearances with good reproducibility. In addition, the curing reaction proceeds in two steps. Thus, the setting of the process conditions becomes difficult, and the process window is significantly narrowed. As the result, decorative films having intended rainbow color appearances may not easily be produced.

Accordingly, the objects of the present invention are to provide a decorative film which presents rainbow color appearances irrespective of observing directions, and to provide a method for easily producing such a film having constant quality.

The present invention has been completed to solve the above problems, and provides a decorative film comprising the first resin layer comprising a light-transmitting first resin, the second resin layer which is formed on at least a part of the surface of said first resin layer and comprises a light-transmitting second resin having a larger coefficient of thermal expansion than that of the first resin, and a metal layer formed on said second resin layer, wherein the thickness of said second resin layer is from 0.3 to 0.8 $\mu$m, and said metal layer has uneven parts having a pitch width of 3.0 $\mu$m or less which are randomly formed in contact with at least said second resin layer, and also a method for producing a decorative film comprising the steps of:

(A) forming a decorative film precursor by providing the first resin layer comprising a light-transmitting first resin, forming the second resin layer of a light-transmitting second resin having a thickness of from 0.3 to 0.8 $\mu$m on at least a part of the surface of said first resin layer, said second resin having a larger coefficient of thermal expansion than that of the first resin, and forming a metal layer on said second resin layer, and (B) heating said decorative film precursor to randomly form uneven parts in the metal layer having a pitch width of 3.0 $\mu$m or less in contact with at least said second resin layer.

DETAILED DESCRIPTION OF THE INVENTION

Figure 1:
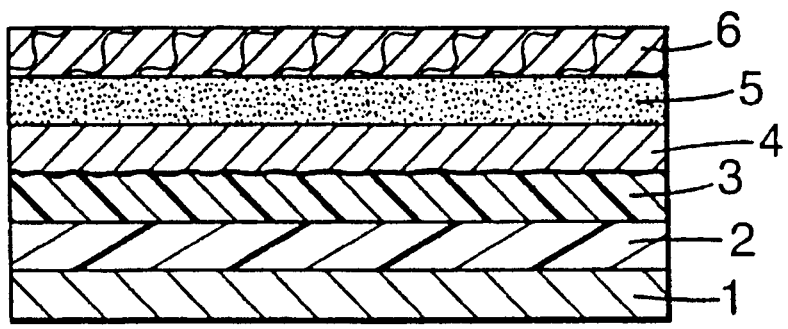
FIG. 1 is a schematic cross section of one embodiment of the decorative film according to the present invention. 1—Substrate, 2—First resin layer, 3—Second resin layer, 4—Metal layer, 5—Adhesive layer, 6—Release layer.

The decorative film of the present invention will be explained by making reference to working embodiments, which do not limit the scope of the present invention.

FIG. 1 shows the cross section of one working embodiment of the decorative film of the present invention. The decorative film of FIG. 1 comprises a substrate 1, the first resin layer 2, the second resin layer 3, and a metal layer 4. Furthermore, this film has an adhesive layer 5 for adhering the decorative film to an adherent, and a release layer 6 comprising a paper sheet or a polymer for protecting the adhesive layer 5 prior to the use of the decorative film. In addition, uneven parts are randomly formed on the surface of the metal layer 4 which is in contact with the second resin layer 3.

The substrate of the decorative film is usually transparent. The substrate is preferably made of polyurethane, acrylic or vinyl chloride resins, and has flexibility. The thickness of the substrate is preferably from 20 to 100 $\mu$m. When the thickness of the substrate is less than 20 $\mu$m, the strength of the film tends to deteriorate and the weather resistance of the film may be worsened. When the thickness of the substrate exceeds 100 $\mu$m, it may lose flexibility, and in turn, the shape-follow-up properties of the film tend to deteriorate. When the substrate is unified with the below-described first resin layer, the maximum thickness of the substrate is not limited by the above upper limit. In this case, the total thickness of the substrate together with the first resin layer does not exceed 110 $\mu$m.

The first resin layer comprising the light-transmitting first resin is formed on the substrate. The first resin preferably comprises a fluororesin such as polyvinyl fluoride, polyvinylidene fluoride, etc., or an acrylic, polyurethane or polyester resin which is crosslinked with a crosslinking agent such as isocyanurate compounds at a high crosslinking degree. More preferably, the polyurethane or polyester resin has siloxane linkages (—Si—O—) in molecules, preferably 1 to 100 siloxane linkages per one molecule. When the resin contains at least one siloxane linkage in a molecule, the coefficient of thermal expansion of the polyurethane or polyester resin can effectively decrease. When the number of the siloxane linkages is too large, the reactivity of the resin with a crosslinking agent and thus the coefficient of thermal expansion may not effectively decrease.

When the resin is crosslinked at a high crosslinking degree, the amount of a crosslinking agent is preferably in the range between 50 and 300 wt. parts per 100 wt. parts of the resins. When the crosslinked resin is used, the crosslinking is preferably completed prior to the heating of the decorative film precursor. Otherwise, the minute uneven parts may not form in good conditions, and in turn the desired rainbow color appearances may not appear.

Polyester resins having siloxane linkages in the molecules may be prepared by polymerizing polyols having a siloxane linkage in a molecule and polybasic acids such as dicarboxylic acids, while polyurethane having siloxane linkages in the molecules may be prepared by polymerizing isocyanate group-containing compound and hydroxy group-containing compounds including the above polyols. Herein, the term "polyols" mean compounds having at least two hydroxy groups in a molecule and include polyfunctional compounds such as diols, triols, etc.

Preferable examples of the polyols are polyols described in JP-A-5-97868, which have a siloxane linkage in a molecule and two or three hydroxy groups at the terminals of the molecule. Alternatively, polysiloxane having at least two alkoxy groups bonded to silicon atoms which can be easily hydrolyzed in the presence of water can he used. The obtained polyester or polyurethane resins have good heat resistance, oxidation resistance, etc. and good adhesion properties to the metal layer, since such polyols have a siloxane linkage in the molecule.

The above polyols may have other functional groups such as ester, ether, carboxyl, phenyl, methyl, ethyl, acryl or amino groups. In particular, polyols having benzene rings disclosed in JP-A-4-41493, for example, 1,3-bis(p-hydroxybenzyl)-1,1,3,3-tetramethyldisiloxane and their derivatives have very good heat resistance.

Suitable isocyanates for the preparation of polyurethane are aromatic, aromaticaliphatic, aliphatic and alicyclic isocyanates, for example, diphenylmethane 4,4'-diisocyanate (MDI), tolylene diisocyanate (TDI), hexamethylene diisocyanate, isophorone diisocyanate, dicyclohexylmethane 4,4'-diisocyanate, naphthylene diisocyanate (NDI), and their terminal-blocked derivatives. Resin layers formed using the trimers of these isocyanates have good heat resistance. In particular, resin layers formed using the trimers of isophorone diisocyanate (IPDI), hexamethylene diisocyanate (HDI) and the like are preferable, since they have excellent heat resistance and also provide polyurethane which does not yellow. Such isocyante trimers can function as crosslinking agents.

The second resin layer comprising the light-transmitting second resin, which has a larger coefficient of thermal expansion than that of the first resin, is formed at a uniform thickness an at least a part of, preferably all of the surface of the first resin layer.

When the first resin is the above described one and has a coefficient of thermal expansion in the order of $10^{-5}/°$ C. or less, the second resin is preferably an acrylic resin, a polyester resin or a polyurethane resin having a low crosslinking degree, and has a coefficient of thermal expansion in the order of $10^{-4}/°$ C. or higher.

The layer of a metal such as aluminum, tin or chromium is formed on and in close contact with the second resin layer by vacuum deposition, sputtering, plating, hot-stamping, etc.

Preferably the metal layer has a thickness of from 50 to 5,000 Å. When the thickness of the metal layer is less than 50 Å, the metal layer tends to have decreased mechanical properties. When the thickness of the metal layer exceed 5,000 Å, the minute unevenness may not form when the decorative film precursor is heated.

In the decorative film of the present invention, minute uneven parts are formed on the metal layer in contact with at least the second resin layer. The uneven parts are formed with a relatively small distance (pitch width) of 3.0 μm or less, preferably 2.0 μm or less, and can function as a lattice grating effective for visible light.

Accordingly, when the metal layer of the decorative firm is illuminated with white light through the substrate, first resin layer and second resin layer, the light is reflected by the uneven parts, and thus the decorative film presents the rainbow color appearance.

White light is diffused by the decorative film of the present invention and causes halation, since the uneven parts are randomly formed. As the result, the diffracted light, which induces the rainbow color appearances, emanates not only in the specific direction but also in any direction. That is, the decorative film of the present invention presents the rainbow color appearances in any observing directions, and can improve the visibility of the rainbow color.

If necessary, an adhesive layer comprising an acrylic, silicone, urethane, epoxy or rubber adhesive may be formed on the metal layer. The adhesive layer facilitates the fitting of the decorative film onto an adherent to be decorated. Furthermore, a release layer is provided on the adhesive layer to protect the adhesive layer prior to the fitting of the decorative film.

Now, the production method of the decorative film of the present invention will be explained.

Hereinafter, the production method of the decorative film shown in FIG. 1 will be explained, but the present invention is not limited to such a method.

Firstly, a light-transmitting substrate is provided, and the first resin layer 2 of the light-transmitting first resin is formed.

In this case, the first resin has a relatively small coefficient of thermal expansion in the order of $10^{-5}/°$ C. or less. Thus, the thermal expansion of the first resin layer is suppressed, when it is heated at a temperature of from 60 to 160° C.

The first resin layer is preferably formed at a thickness of from 0.1 to 10 μm. When the thickness of the first resin layer is less than 0.1 μm, the formation of the isotropic uneven parts in the metal layer is interfered. When the thickness of the first resin layer exceeds 10 μm, the layer has no flexibility and the film has deteriorated shape-follow-up properties.

Next, a second resin layer 3, which comprises a light-transmitting second resin having a larger coefficient of thermal expansion than that of the first resin and has a substantially uniform thickness, is formed on the first resin layer 2 by any coating method such as gravure coating, reverse roll coating, etc.

The second resin layer has a thickness of from 0.3 to 0.8 μm. When the thickness of the second resin layer is less than 0.3 µm, the second resin layer does not sufficiently expand on heating, and thus the formation of the uneven parts of the metal layer becomes difficult and a decorative film presents no rainbow color appearance. When the thickness of the second resin layer exceeds 0.8 µm, the distances between the uneven parts become too large, and thus the light-interference function is suppressed so that a decorative film presents no rainbow color appearance. That is, the uneven parts may not function as a lattice grating. The thickness of the second resin layer is preferably from 0.4 to 0.6 µm, since a decorative film easily present the rainbow color appearance.

Thereafter, a metal layer 4 having the above-specified thickness is formed on the second resin layer 3 by vapor deposition and the like.

Then, an adhesive layer 5 having a release layer 6 is adhered to the metal layer, if necessary. Thereby, a decorative film precursor is obtained, which comprises the substrate 1, the first resin layer 2, the second resin layer 3, the metal layer 4, the adhesive layer 5 and the release layer 6, that are laminated in this order.

The obtained decorative film precursor is heated for a certain time to thermally expand the second resin layer reversibly. Then, the metal layer in contact with the second resin layer is subjected to an isotropic tensile stress which exceeds the elastic limit of the metal film. That is, the metal layer is plastically deformed isotropically.

Then, the heating is stopped, and the film is allowed to reversibly shrink. Thus, the plastically deformed metal layer two-dimensionally crinkles, as the second resin layer isotropically shrinks. As the result, a decorative film is obtained, in which uneven parts are formed on the metal layer which is in contact with at least the second resin layer.

The decorative film which has been produced by the reversible thermal expansion and shrinkage of the second resin layer does not suffer from substantial dimensional change. Therefore, such decorative films can be produced with good reproducibility unless the materials of the films are not substantially modified by heating.

A decorative film precursor is preferably heated around a temperature in the range between 60 and 150° C., when the first resin layer, second resin layer and metal layer are made of the above-described materials, respectively. When the heating temperature is less than 60° C., the appearance of the decorative film tends to alter due to the change of temperature (for example, temperature rise caused by direct sunlight) after the adhesion of the film to an adherent, when the decorative film is used as a marking film. When the heating temperature is set higher than 150° C., the kinds of the first resins are significantly limited.

The decorative film of the present invention has been explained by making reference to one embodiment. However, the present invention is not limited to the above embodiment. The substrate, first resin layer or second resin layer may be colored with pigments or dyes, insofar as they are transparent. The substrate may serve as a first resin layer, insofar as it has the above-defined coefficient of thermal expansion. Furthermore, the second resin layer may be formed on parts of the first resin layer, so that the film presents rainbow color appearance only at the specific parts.

EXAMPLES

The present invention will be illustrated by the following Examples.

Example 1

Firstly, a co-extrusion molded film (Trade name: DX-14s manufactured by DENKI KAGAKU KOGYO KABUSFIIIKAISHP.) was provided, which film is made of the polymer blend of polyvinylidene fluoride (PVdF) and polymethyl methacrylate (PMMA). The co-extrusion molded film had the first molded layer containing a relatively large amount of PMMA and the second molded layer containing a relatively large amount of PVdF.

Separately, a polyethylene terephthalate (PET) film (MELINEX FILM manufactured by DuPont) was provided as a carrier.

The PET film was heat laminated on the first molded layer of the co-extrusion molded film, to form a substrate which functions also as a first resin layer.

An 8% solution of PMMA (Elvacite 2021 Manufactured by DuPont) in toluene was pattern printed with a gravure printer on the second molded layer of the co-extrusion molded film to which the carrier had been heat laminated, and then dried at 120° C. for 1 minute to form a second resin layer having a thickness of 0.53 µm.

After that, an aluminum metal layer having a thickness of 500 Å was formed on the second resin layer with a vacuum deposition apparatus.

On a release paper as a release layer, an acrylic adhesive was coated at a thickness of 30 µm, and dried to form an adhesive layer. Then, the release paper carrying the adhesive layer was laminated on the metal layer. Thereafter., the PET film as the carrier was removed to obtain a decorative film precursor.

The obtained decorative film precursor was placed in an oven and heated at 120° C. for 3 minutes to obtain a decorative film.

The distance of the uneven parts of the decorative film was measured with a surface-shape measuring microscope (VF-7510 manufactured by KEYENCE), and it was 1.5 µm. This value of the distance was an average value obtained by arbitrarily selecting 5 points from the uneven parts, measuring the pitch widths at 5 points, and averaging the measured pitch widths.

The metal layer was illuminated with white light from a white light source or sun light through the substrate, first resin layer and second resin layer, and uniform rainbow color appearances were observed irrespective of the observing directions.

Example 2

Firstly, a vinyl chloride resin was applied on the same PET film as that used as a carrier in Example 1 to form a substrate having a thickness of 50 µm.

Next, on the substrate made of the vinyl chloride resin, a mixture of 200 wt. parts of a linear saturated polyester resin (VYLON 24 SS manufactured by TOYOBO Co., Ltd.) and 3 wt. parts of CORONATE HX (manufactured by NIPPON POLYURETHANE INDUSRTY CO., LTD.) was applied and then dried at 150° C. for 2 minutes to obtain a primer layer having a thickness of 5 µm. This primer layer enhanced the adhesion between the vinyl chloride resin and the first resin layer.

Separately, a solution containing 100 wt. parts of a silicone-modified polyester (BAYSILONE RESIN UD-460 manufactured by BAYER SYNTHETIC SILICONE Co., Ltd.) and 75 wt. parts of isophorone diisocyanate (DESMODUR Z 4370 manufactured by SUMITOMO BAYER JAPAN Co., Ltd.) was prepared and applied on the above primer layer, followed by drying at 180° C. for 3 minutes, to obtain the first resin layer having a thickness of 2 µm which was in close contact with the primer layer.

Thereafter, a solution, which was prepared by diluting the same primer solution as that used in the above step to a solid content of 5%, was gravure printed on the first resin layer and dried at 160° C. for 1 minute to obtain the second resin layer having a thickness of 0.55 μm.

An aluminum metal layer having a thickness of 500 Å was formed on the second resin layer in the same manner as in Example 1.

Also, an adhesive layer having a thickness of 30 μm formed on a release paper was laminated on the metal layer, like in Example 1. Thereafter, the PET film as a carrier was removed to obtain a decorative film precursor.

The obtained decorative film precursor was placed in an oven and heated at 120° C. for 3 minutes like in Example 1 to obtain a decorative film.

The distance of the uneven parts of the decorative film was measured with the same surface-shape measuring microscope as used in Example 1, and it was 1.8 μm.

The metal layer was illuminated with white light from the same white light source as used in Example 1, and uniform rainbow color appearances were observed irrespective of the observing directions.

Effects of the Invention

Flexible metallic films which present rainbow color appearances can be easily produced by the above steps with good reproducibility. In addition, minute uneven patterns, which function as diffraction gratings, are formed on the surface of the metal layer of the obtained film, and thus the films can present substantially uniform rainbow color appearances in any observing directions.

What is claimed is:

1. A decorative film comprising:

a first resin layer comprising a light-transmitting first resin, a second resin layer which is formed on at least a part of the surface of said first resin layer and comprises a light-transmitting second resin having a larger coefficient of thermal expansion than that of the first resin, and a metal layer formed on said second resin layer, wherein the thickness of said second resin layer is from 0.3 to 0.8 μm, and said metal layer has uneven parts having a pitch width of 3.0 μm or less which are randomly formed in contact with at least said second resin layer.

2. A method for producing a decorative film comprising the steps of:

(A) forming a decorative film precursor by
providing a first resin layer comprising a light-transmitting first resin,
forming a second resin layer of at light-transmitting second resin having a thickness of from 0.3 to 0.8 μm on at least a part of the surface of said first resin layer, said second resin having a larger coefficient of thermal expansion than that of the first resin, and
forming a metal layer on said second resin layer, and (B) heating said decorative film precursor to randomly form uneven parts having a pitch width of 3.0 μm or less in contact with at least said second resin layer.

3. The method of claim 2, wherein said decorative film precursor is heated at a temperature of from 60 to 150° C.

* * * * *

UNITED STATES PATENT AND TRADEMARK OFFICE
CERTIFICATE OF CORRECTION

PATENT NO. : 6,383,613 B1
DATED : May 7, 2002
INVENTOR(S) : Takeda, Yasuyuki

It is certified that error appears in the above-identified patent and that said Letters Patent is hereby corrected as shown below:

Column 5,
Line 48, delete "150º C.,.the" and insert in place thereof -- 150º C., the --.

Column 6,
Line 1, delete "KABUSFIIIKAISHP" and insert thereof -- KABUSHIKIKAISHP --.
Line 26, delete "Thereafter.," and insert in place thereof -- Thereafter, --.

Column 8,
Line 20, delete "at" and insert in place thereof -- a --.

Signed and Sealed this

Seventh Day of January, 2003

JAMES E. ROGAN
*Director of the United States Patent and Trademark Office*